United States Patent [19]

Schoening

[11] Patent Number: 4,746,934
[45] Date of Patent: May 24, 1988

[54] COLOR IMAGE COPYING SYSTEM USING A CATHODE-RAY TUBE WITH DIFFRACTION GRATING FACE PLATE

[75] Inventor: Susan C. Schoening, Portland, Oreg.

[73] Assignee: Tektronix, Inc., Beaverton, Oreg.

[21] Appl. No.: 882,750

[22] Filed: Jul. 7, 1986

[51] Int. Cl.⁴ .................. G01D 9/42; G01D 15/06; H04N 1/46
[52] U.S. Cl. .................. 346/110 R; 346/158; 346/161; 358/75; 358/78
[58] Field of Search .................. 346/110 R, 158, 161; 358/75, 300, 302, 78

[56] References Cited

U.S. PATENT DOCUMENTS 4,309,720  1/1982  Denham .................. 358/78
4,642,700  2/1987  Ohta .................. 358/293

*Primary Examiner*—H. Broome
*Assistant Examiner*—Mark Reinhart
*Attorney, Agent, or Firm*—John D. Winkelman; Paul S. Angello

[57] ABSTRACT

A color image copying system (10) employs a cathode-ray tube (16) that employs a diffraction grating face plate (38) which for each image disperses to predetermined focal regions (132, 143, and 136) light rays of corresponding wavelengths. The light rays sequentially expose a region 80 of a scrolled light-sensitive medium (42) to form a composite color copy of the image. Bands of phosphorescent materials (32, 34, and 36) are applied on angularly inclined subregions (146, 148, and 150) of the inner surface (144) of the face plate and intercept a raster-scanned electron beam (22) to develop light of the different wavelengths. The inner surface of the face plate has angularly inclined subregions (146, 148, and 150) that provide for incident light rays of each wavelength an angular offset of equal magnitude but opposite rotational sense to compensate for changes in diffraction angles ($\beta_1$, $\beta_2$, and $\beta_3$) that would otherwise result from the transmission of different wavelengths of light through the diffraction grating.

16 Claims, 3 Drawing Sheets

COLOR IMAGE COPYING SYSTEM USING A CATHODE-RAY TUBE WITH DIFFRACTION GRATING FACE PLATE

BACKGROUND OF THE INVENTION

The present invention relates to systems for forming permanent copies of cathode-ray tube images and, in particular, such a system that employs a diffraction grating face plate which for each image disperses to predetermined focal regions light rays of corresponding wavelengths which sequentially expose a region of a scrolled light-sensitive medium to form a composite color copy of the image.

Systems for making permanent copies of cathode-ray tube images are known. For example, U.S. Pat. No. 3,679,824 of Gibson, Jr. describes a system for providing copies of information stored on a cathode-ray storage tube. The Gibson system includes copying apparatus that is provided with a scanning mechanism operatively associated with a moveable light-sensitive surface which is adapted to provide a permanent copy of the image.

In the Gibson system, successive portions of an image to be copied are moved across a display screen at a speed synchronous to the movement of the light-sensitive surface, which is disposed adjacent the screen. An image that is larger than the screen can be scrolled across the screen to produce in the similarly scrolled light-sensitive surface a reconstructed representation of an entire image. This system suffers from two major disadvantages, of which one is the need for a fiber optic focusing material, which is relatively expensive, to present to the light-sensitive surface a focused reproduction of the image and the other is the inability to produce color copies of color images.

U.S. Pat. No. 4,309,720 of Denham describes a system for converting an electrical signal that defines a refreshed raster-scan image into an permanent hard copy representation of the image. The system divides each image into plural segments, each segment having three color components. Successive segments of the raster-scan image are scrolled across a display screen of a cathode-ray tube whose target structure comprises three adjacent strips of different phosphor materials. A light-sensitive medium is scrolled across the display screen at the same rate and is successively exposed to each color component of each segment of the image.

The Denham system also suffers from the disadvantage of requiring the use of a fiber optic focusing material over the display area defined by the phosphorescent strips to present to the light-sensitive medium a focused reproduction of the image appearing within the display area.

U.S. Pat. No. 4,172,259 of Lowe describes a graphic recording apparatus that is compensated for record medium velocity changes. The Lowe system includes a fiber optic cathode-ray tube over which a light-sensitive medium is scrolled to form a copy of the image appearing in the display area of the cathode ray tube. The velocity compensating mechanism is described with reference to a line scan fiber optic cathode-ray tube that is capable of producing monochrome copies of the cathode-ray tube image.

An article authored by J. E. Wurtz, "Color Display and Recording With CRTs," *Electro-Optical Systems Design*, April 1981, pp. 42 and 43, briefly describes a line scan fiber optic cathode-ray tube as a means for obtaining color copies of a cathode-ray tube image. The article also suggests other means for generating light in three colors. These include the use of three narrow phosphor stripes positioned on the face plate of the cathode-ray tube or the use of a prism positioned in the optical path of light passing through a white phosphor to separate the colors. The Wurtz article contemplates only systems using fiber optic cathode-ray tubes as a means to provide a focused image in the display area.

SUMMARY OF THE INVENTION

An object of the present invention is, therefore, to provide a color image copying system that employs a cathode-ray tube and develops without the use of fiber optic material a focused image in different colors for recordation in a light-sensitive medium.

Another object of this invention is to provide such a system in which a cathode-ray tube produces a single electron beam that strikes bands of phosphorescent materials which emit different wavelengths of light to form the image in different colors.

A further object of this invention is to provide such a system that is operable in the absence of fiber optic material to disperse and focus image-carrying light rays to produce in a light-sensitive medium color copies of color images.

Additional objects and advantages of the present invention will be apparent from the following detailed description of a preferred embodiment thereof, which proceeds with reference to the accompanying drawings.

DETAILED DESCRIPTION OF PREFERRED EMBODIMENT

Figure 1:
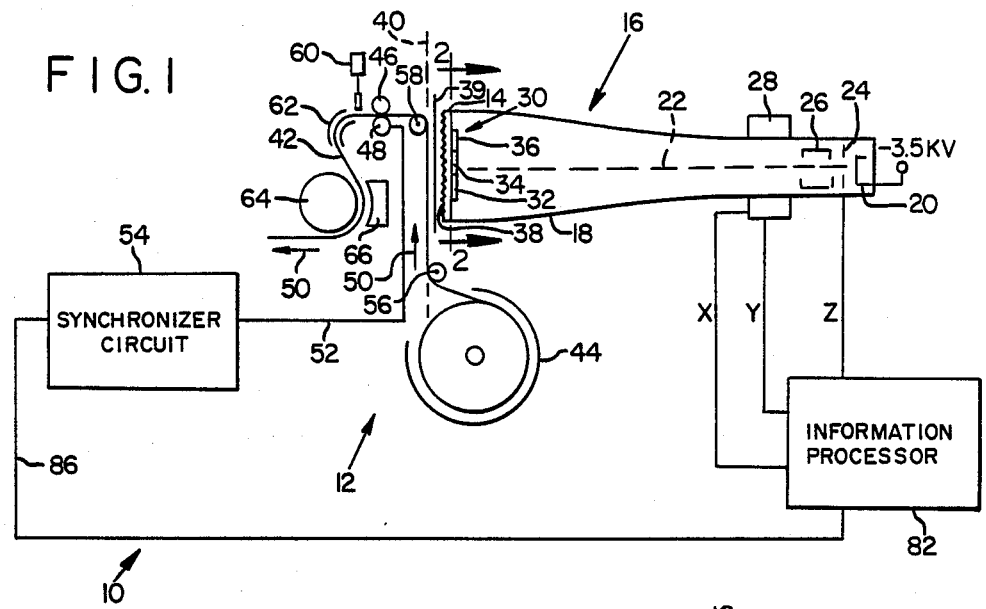
FIG. 1 is a schematic side view of a copying system that includes a cathode-ray tube which is shown partly in section and which employs a face plate having a diffraction grating display surface in accordance with the present invention.

FIG. 1 is a schematic side view of a copying system 10 that includes a hard copy processor 12 that is positioned near the display surface of the face plate 14 of a cathode-ray tube 16. Cathode-ray tube 16 is relatively flat in the vertical direction as shown and includes an evacuated envelope 18. A cathode 20 positioned within envelope 18 emits a beam 22 of electrons that pass through a control grid 24 and a focusing accelerating anode structure 26 to form a narrow writing beam of high velocity electrons. Cathode-ray tube 16 is preferably of the magnetically deflected type having a deflection yoke 28 that includes a horizontal deflection coil and a vertical deflection coil which deflect the electron beam 22 in the horizontal direction and vertical direction, respectively. Electron beam 22 propagates toward and strikes a target structure 30 which is mounted on the inner surface of face plate 14.

Figure 2:
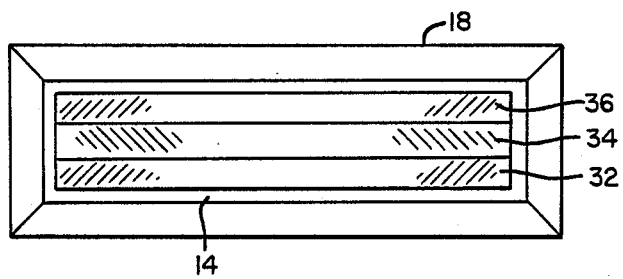
FIG. 2 is a sectional view taken along lines 2—2 of FIG. 1 to show three bands of phosphorescent materials deposited on the surface of the face plate opposite the diffraction grating display surface.

With particular reference to FIG. 2, target structure 30 comprises three elongate bands or strips 32, 34, and 36 of different phosphorescent materials that are deposited on the inner surface of face plate 14 in mutually parallel juxtaposition. Phosphorescent bands 32, 34, and 36 have the same dimensions. The longer dimension of target structure 30 is, therefore, parallel to the longer dimension of phosphorescent bands 32, 34, and 36 and perpendicular to the plane of FIG. 1. The bands of phosphorescent materials 32, 34, and 36 form an elongated narrow display area.

Each one of the phosphorescent materials 32, 34, and 36 is illuminated in the usual manner when electron beam 22 strikes it and is selected to produce light energy having a wavelength which is different from that produced by the other two phosphorescent materials. It will be appreciated that the longer dimension of target structure 30 extends in the horizontal direction and, therefore, dictates that the vertical deflection coil be arranged to have a lesser effect than that produced by the horizontal deflection coil.

With reference to FIG. 1, the outer or display surface of face plate 14 comprises a diffraction grating 38 that disperses to a line focus configuration the different wavelengths of light emanating from phosphorescent materials 32, 34, and 36 in the manner described below. Each of the wavelengths of light propagating from face plate 14 passes through a different slit in an optical bandwidth-limiting slit element 39 and converges to a line focus in a predetermined location which is different from that of the other two wavelengths of light. The line foci of the three wavelengths of light define a generally planar vertically disposed focal surface 40 that is spaced from face plate 14 by a predetermined amount. The image produced by phosphorescent materials 32, 34, and 36 appears on focal surface 40 and exposes a light-sensitive medium 42 which is disposed in coincident relation with focal surface 40 along the portion that is parallel to the vertical dimension of face plate 14. Light-sensitive medium 42 preferably comprises microencapsulated paper of any one of the types manufactured by Mead Corporation and described in U.S. Pat. Nos. 4,399,209 and 4,440,846.

Light-sensitive paper 42 is stored on a roll in a container 44 and is drawn past face plate 14 by means of clutch-operated pressure rollers 46 and 48, with roller 46 continuously turning in a clockwise direction to draw paper 42 in the direction indicated by arrow 50 in FIG. 1. Roller 48 is urged upwardly by means of a clutch (not shown) to frictionally engage paper 42 and pull it to the left as shown in FIG. 1. Whenever roller 48 engages paper 42, a signal is delivered by way of an electrical conductor 52 to a synchronizing circuit 54 to initiate its operation to synchronize the motion of paper 42 to the production of the images appearing on face plate 14 as will be described below. Guide rollers 56 and 58 direct paper 42 along a path coincident with focal surface 40 in the area of face plate 14.

Paper 42 has a light-sensitive coating that includes microcapsules containing a monomer, a photoinitiator, and a colorless dye precursor. The exposure of paper 42 to any one of the wavelengths of light converts the liquid monomer to a solid polymer. Passing paper 42 between pressure rollers 46 and 48 develops the image by bringing the microcapsules in contact with a layer of acid developer. The unexposed microcapsules rupture and react with the developer to form a dye and thereby a visible image. Paper 42 becomes a positive medium in which exposed areas are light and unexposed areas are dark.

Upon completion of the processing by pressure rollers 46 and 48, paper 42 passes under a clutch-operated cutting mechanism 60 and around a guide member 62 which directs the paper between a continuously operating roller 64 and a heating device 66. Heating device 66 accelerates the dye formation to provide a color copy of the image in a relatively short period of time. Heating the paper to about 100° C. provides an image with fully saturated colors in several seconds. Cutting mechanism 60 functions to cut paper 42 into individual sheets that provide a graphic representation of the image displayed on face plate 14 of cathode-ray tube 16. It will be appreciated that a hard copy graphic representation of the image displayed by cathode-ray tube 16 is achievable without the use of a fiber optic material.

The above-described process has been described with reference to microencapsulated paper that includes a layer of developer. The present invention can be practiced also with separate microencapsulated and developer sheets to provide an image transfer copying system. Such a system would use a roll of developer paper and a guide mechanism for bringing the two sheets into contact between pressure rollers 46 and 48. The dye would then be formed in the unexposed area of the developer paper, and heating device 66 would be used to heat the developer paper.

Figure 3A:
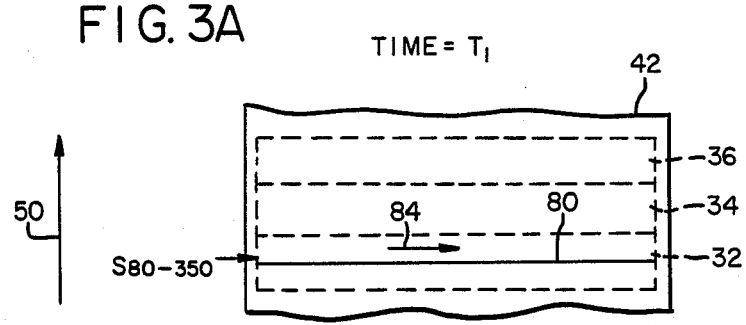
FIGS. 3A–3C are explanatory illustrations of a raster presentation of image information that is carried by light of three wavelengths to expose a light-sensitive medium in accordance with the invention.
Figure 3B:
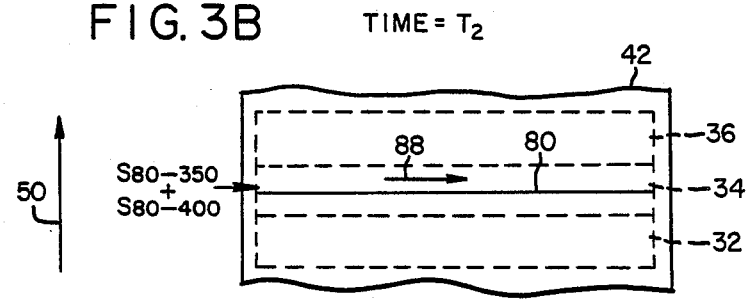
Figure 3C:
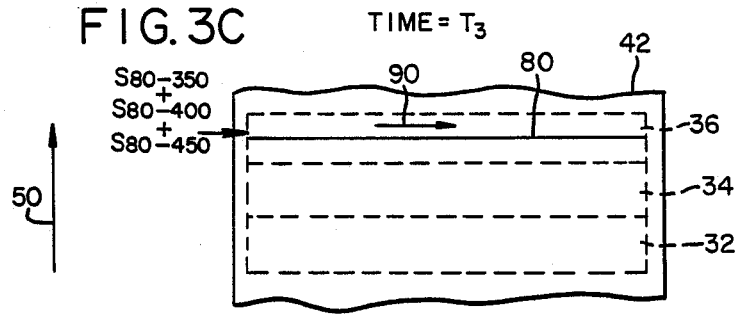

FIGS. 3A-3C show in three discrete time intervals the stepwise sequence for exposing an exemplary region 80 of paper 42 to the light of different wavelengths which carry the image information and propagate from diffraction grating 38. With reference to FIGS. 3A-3C, region 80 of paper 42 is shown in the form of a solid line positioned in the center and in parallel relation to the length of each one of the bands of phosphorescent materials 32, 34, and 36. For purposes of illustration, phosphorescent materials 32, 34, and 36 emit light of the wavelengths of 350, 400, and 450 nanometers, respectively.

FIGS. 3A-3C show a section of paper 42 positioned over the bands of phosphorescent materials, which are indicated by broken lines. An information processor circuit 82 (FIG. 1) delivers electrical signals on its X, Y, and Z output conductors to write the image information on target structure 30 of cathode-ray tube 16. The electrical signals appearing on the X and Y output conductors are delivered to the respective X coil and Y coil of deflection yoke 28 to produce a raster-scan presentation of the image information. The electrical signal applied to the Z output conductor of information processor 82 modulates the intensity of the light developed during the raster-scan process.

The image information is presented in three color components, of which each corresponds to the wavelength of light emitted by one of the three phosphorescent materials 32, 34, and 36. Each image corresponding to the image information has the same dimensions as those of region 80. Each component of image information is scanned as a single line across the length of each band of phosphorescent material, i.e., in a direction parallel to its longer dimension, from one end to the other end of the band. The image information is written, therefore, as a series of lines in a band-by-band sequence as will be described below. A composite image is formed by exposing and developing adjacent regions of paper 42 to a series of images. It will be appreciated that the present invention can be used to produce color copies with image information presented in at least two color components.

With reference to FIG. 3A, during a time interval $T_1$, region 80 of paper 42 is aligned with the center of phosphorescent band 32, which emits light of a wavelength of 350 nanometers. The component of image information corresponding to the 350 nanometer light is written in region 80 by cathode-ray tube 16 during this time. Electron beam 22 scans phosphorescent band 32 along a path 84, which band emits 350 nanometer light that exposes region 80 of paper 42. Upon exposure to the light, the microcapsules included in paper 42 and sensitive to 350 nanometer light are converted from a liquid monomer to a solid polymer. The exposure taking place during time interval $T_1$ produces in region 80 an image component, which is identified as $S_{80-350}$ in FIG. 3A. After completion of the scan of phosphorescent band 32, information processing circuit 82 applies a signal to electrical conductor 86 for delivery to synchronizing circuit 54 to advance paper 42 in direction 50.

With reference to FIG. 3B, during a time interval $T_2$, region 80 of paper 42 is aligned with the center of phosphorescent band 34, which emits light of a wavelength of 400 nanometers. The component of image information corresponding to the 400 nanometer light is written in region 80 by cathode-ray tube 16 during this time. Electron beam 22 scans phosphorescent band 34 along a path 88, which band emits 400 nanometer light that exposes region 80 of paper 42. Upon exposure to the light, the microcapsules included in paper 42 and sensitive to 400 nanometer light are converted from a liquid monomer to a solid polymer. The exposure taking place during time interval $T_2$ produces in region 80 an image component, which is identified as $S_{80-400}$ in FIG. 3B. At this time, region 80 has undergone cumulative exposure to 350 and 400 nanometer light. This cumulative exposure is expressed as $S_{80-350}+S_{80-400}$ in FIG. 3B. After completion of the scan of phosphorescent band 34, information processing circuit 82 applies a signal to electrical conductor 84 for delivery to synchronizing circuit 54 to advance paper 42 in direction 50.

With reference to FIG. 3C, during a time interval $T_3$, region 80 of paper 42 is aligned with the center of phosphorescent band 36, which passes light of a wavelength of 450 nanometers. The component of image information corresponding to the 450 nanometer light is written in region 80 by cathode-ray tube 16 during this time. Electron beam 22 scans phosphorescent band 36 along a path 90, which band emits 450 nanometer light that exposes region 80 of paper 42. Upon exposure to the light, the microcapsules included in paper 42 and sensitive to 450 nanometer light are converted from a liquid monomer to a solid polymer. The exposure taking place during time interval $T_3$ produces an image component which is identified as $S_{80-450}$ in FIG. 3C. At this time, region 80 has undergone cumulative exposure to 350, 400, and 450 nanometer light. This cumulative exposure is expressed as $S_{80-350}+S_{80-400}+S_{80-450}$ in FIG. 3C.

Region 80 of paper 42 advances in direction 50 for further processing by pressure rollers 46 and 48 and heating device 66 to develop a color copy of the image information in the manner described above. As the displayed image and paper 42 move in synchronism across face plate 14, each region of light-sensitive paper 42 will be successively exposed to each of the three components of the image information for developing in each region a hard-copy representation of the image as defined by the cumulative sum of its color components.

It will be appreciated that the scanning motion of electron beam 22 causes each one of the three phosphorescent bands to emit a different color component of different image information in three successive regions of paper 42 before it advances in direction 50 to the next exposure position. Paper 42 advances a distance equal to the electron beam spot diameter, which is about 0.0254 mm, to get to the next adjacent exposure position. Since each of the phosphorescent bands is wider than the electron beam spot diameter, many lines of different image information are scanned across paper 42 from $T_1$ to $T_2$ and from $T_2$ to $T_3$ in the above example.

Figure 4:
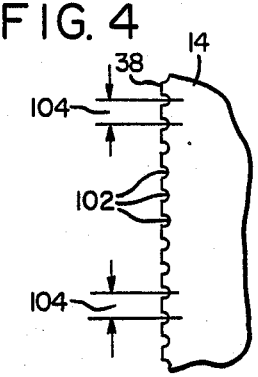
FIG. 4 is an enlarged fragmentary cross sectional view of the diffraction grating display surface of the cathode-ray tube of FIG. 1.

FIG. 4 shows the diffraction grating display surface 38 of face plate 14 which promotes the successful operation of copying system 10 without the use of a fiber optic focusing material. With reference to FIG. 4, display surface 38 of face plate 14 comprises a diffraction grating ruled preferably on a quartz glass or other ultraviolet light transparent substrate. The rulings 102 extend along face plate 14 in a direction parallel to the lengths of the bands of phosphorescent materials 32, 34, and 36. The raster-scanning motion of electron beam 22 is, therefore, generally parallel to the lengths of the rulings. In a preferred embodiment, the distances 104 between adjacent ones of the rulings are the same and equal about one micron.

Figure 5:
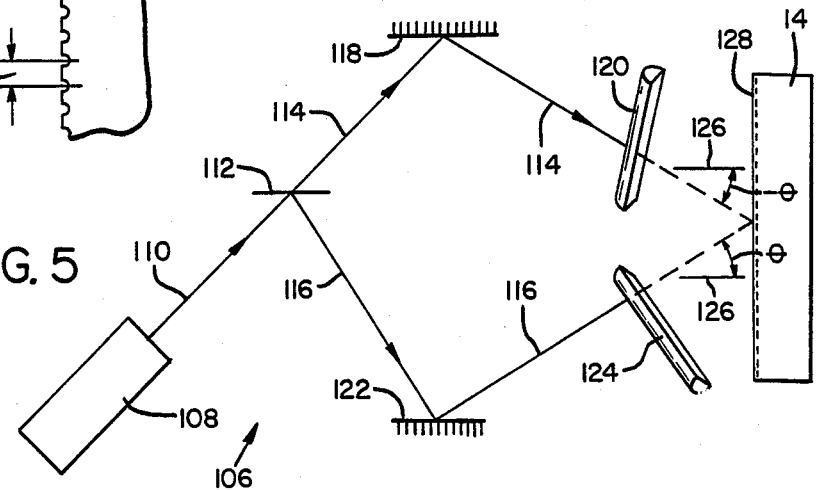
FIG. 5 is a diagram of the exposure apparatus for inscribing the diffraction grating in the face plate of the cathode-ray tube of FIG. 1.

FIG. 5 is a diagram of the exposure apparatus for inscribing into face plate 14 the ruled surface of diffraction grating 38. The optical components of exposure apparatus 106 are selected and oriented to record a diffraction grating pattern having the desired one micron grating period and to provide rulings that extend along face plate 14 in a direction perpendicular to the plane of FIG. 5. The following expression gives the grating period, i.e., the distance between successive points of constructive and destructive interference of two light beams:

$$\frac{1}{d} = \frac{1}{\lambda}(\sin\theta_1 - \sin\theta_2),$$

where "d" is the grating period, $\lambda$ is the free-space wavelength, and $\theta_1$ and $\theta_2$ are the angles of incidence of the two light beams. The grating period "d" corresponds to distance 104 between adjacent rulings 102 in FIG. 4.

With reference to FIG. 5, a laser source 108 emits a beam 110 of light toward a beamsplitter 112 which divides beam 110 into beam components 114 and 116. Laser source 108 is preferably an argon laser which emits 488 nanometer light. Beam component 114 exits beamsplitter 112, reflects off a mirror 118, and passes through a cylindrical lens 120. Beam component 116 exits beamsplitter 112, reflects of a mirror 122, and passes through a cylindrical lens 124. Cylindrical lenses 120 and 124 function to optically convert the light rays of beam components 114 and 116 from the circular cross section of the laser beam to a linear configuration.

Glass face plate 14 is positioned so that the light rays of beam components 114 and 116 exiting the respective cylindrical lenses 120 and 124 intersect at the surface on which diffraction grating 38 is to be formed. The above mathematical expression is satisfied whenever the optical components are arranged such that the light rays of beam component 114 form an angle $\theta_1 = -14.12°$ with respect to a surface normal 126 and light rays of beam component 116 form an angle $\theta_2 = +14.12°$ with respect to surface normal 126.

The surface of face plate 14 located proximal to cylindrical lenses 120 and 124 is coated with a photoresist material 128. Beam components 116 and 118 expose the photoresist and form an interference pattern in it. The diffraction grating can be made by developing and processing the exposed photoresist in accordance with any one of known techniques, such as, for example, that described by R. C. Enger and S. K. Case, "High Frequency Holographic Transmission Gratings In Photoresist," *Journal of the Optical Society of America*, vol. 73, no. 113, (1983) and R. C. Enger and S. K. Case, "Optical Elements With Ultra-High Spatial-Frequency Configurations," *Applied Optics*, vol. 22, no. 3220, (1983). The result is a face plate 14 that has a diffraction grating period of one micron.

Figure 6:
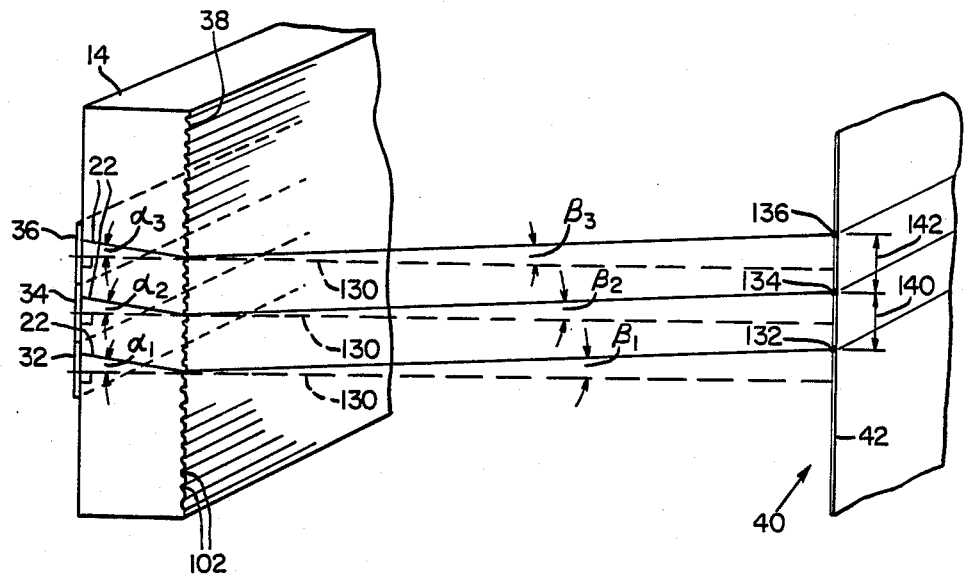
FIG. 6 is a schematic fragmentary isometric view showing the relative orientation and position of the three focal configurations developed for the light rays emanating from the diffraction grating display surface of the cathode-ray tube of FIG. 1.

FIG. 6 is a diagram illustrating the conditions under which 350, 400, and 450 nanometer light rays strike the bands of phosphorescent material 32, 34, and 36 and emerge from a diffraction grating to form focal surfaces in the plane defined by light-sensitive paper 42. In FIG. 6, the phosphorescent bands are deposited on the surface of a glass element of rectangular cross section.

With reference to FIG. 6, electron beam 22 strikes the surfaces of phosphorescent materials 32, 34, and 36 at incident angles $\alpha_1$, $\alpha_2$, and $\alpha_3$, respectively, with respect to a surface normal 130. The 350 nanometer light emitted by phosphorescent material 32 emerges from the diffraction grating at an angle $\beta_1$ with respect to surface normal 130 and strikes a location 132 in the plane 40 defined by paper 42. The 400 nanometer light emitted by phosphorescent material 34 emerges from the diffraction grating at an angle $\beta_2$ with respect to surface normal 130 and strikes a location 134 in plane 40 defined by paper 42. The 450 nanometer light emitted by phosphorescent light material 36 emerges from the diffraction grating at an angle $\beta_3$ with respect to surface normal 130 and strikes a location 136 in plane 40 defined by paper 42.

To ensure that each region of paper 42 is exposed to different wavelengths of light corresponding to the same image information, the distance 140 between locations 132 and 134 and the distance 142 between locations 134 and 136 must be equal. The requirement that distances 140 and 142 be equal dictates that the angles $\beta_1$, $\beta_2$, and $\beta_3$ be equal. Since the wavelengths of light emitted by phosphorescent materials 32, 34, and 36 are different and the angles of incidence $\alpha_1$, $\alpha_2$, and $\alpha_3$ are the same, the angles $\beta_1$, $\beta_2$, and $\beta_3$ are not equal to one another.

The above conditions are rectified by solving the following expression for constructive interference in a transmission grating:

$$m\lambda = d(n_{glass}\sin\alpha + n_{air}\sin\beta),$$

where "m" is the order of diffraction, "$\lambda$" is the freespace wavelength, and "$n_{glass}$" and "$n_{air}$" are the respective indices of refraction of glass and air. Selecting $\alpha_1 = 0°$, m = 1, and d = $10^{-6}$ meter and solving the above equation three times, once each for 350, 400, and 450 nanometer light, provides the required values for $\alpha_2$, $\alpha_3$, $\beta_1$, $\beta_2$, and $\beta_3$. The appropriate indices of refraction for quartz glass and the computed values of the angles are summarized in Table I.

TABLE I

| $\lambda_1$ = 350 nm | $\lambda_2$ = 400 nm | $\lambda_3$ = 450 nm |
|---|---|---|
| $n_1$ glass = 1.47701 | $n_2$ glass = 1.47021 | $n_3$ glass = 1.46564 |
| $n_1$ air = 1.000285 | $n_2$ air = 1.000282 | $n_3$ air = 1.000280 |
| $\alpha_1$ = 0° | $\alpha_2$ = 1.948868° | $\alpha_3$ = 3.912374° |
| $\beta_1$ = 20.48122° | $\beta_2$ = 20.48122° | $\beta_3$ = 20.48122° |

An angular resolution of not less than 1 part in 11,000 is needed to ensure a registration error of no more than the extent of one diameter of a 0.0254 mm electron beam spot over a 28 cm length of paper 42.

Figure 7:
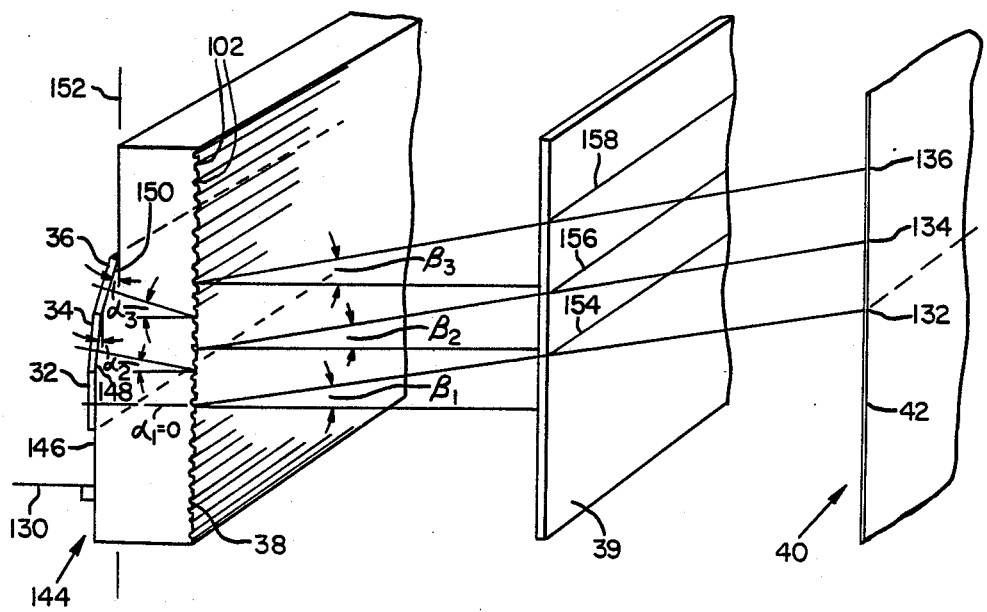
FIG. 7 is a schematic fragmentary isometric view of a face plate having a wedged surface on which the three bands of phosphorescent material are deposited to promote equal separation of the focal configurations of light of different wavelengths that are diffracted by the face plate of the cathode-ray tube of FIG. 1.

FIG. 7 shows the face plate 14 with an optical wedge surface 144 on which the bands of phosphorescent materials 32, 34, and 36 are deposited. Wedge surface 144 comprises three subregions 146, 148, and 150 of different angular inclinations to provide the angular relationships between incident and diffracted light rays as computed above with reference to FIG. 6. Subregion 146 supports the 350 nanometer light-emitting phosphorescent material 32 and is inclined at an angle $\alpha_1 = 0°$ with respect to reference line 152, which is perpendicular to surface normal 130. Subregion 148 supports the 400 nanometer light-emitting phosphorescent material 34 and is inclined at an angle $\alpha_2 = 1.94890°$ measured in the clockwise direction from reference line 152. Subregion 150 supports the 450 nanometer light-emitting phosphorescent material 36 and is inclined at an angle $\alpha_3 = 3.9124°$ measured in the clockwise direction with respect to reference line 152. (For purposes of clarity, the magnitudes of angles $\alpha_2$ and $\alpha_3$ are exaggerated in FIG. 7.)

Forming the wedge surface 144 provides an angular offset of equal magnitude but opposite rotational sense to compensate for the changes in diffraction angles that result from the transmission of different wavelengths of light through diffraction grating 38. The result is that different color components will be brought to a line focus at different but equally spaced-apart locations in plane 40 as electron beam 22 raster scans the phosphorescent bands. This promotes correct registration of the color components of image information as each region of paper 42 is exposed three times to form the cumulative sum and thereby promote the production of a color copy of the image information.

FIG. 7 also shows a slit element 39 which includes slits 154, 156, and 158 through which the 350, 400, and 450 nanometer light rays, respectively, propagate. Slit element 39 constitutes a metal sheet of shim weight with black surfaces and limits the optical bandwidth of the light rays that strike the paper. Slit element 39 prevents, therefore, the exposure of regions of paper 42 to image-carrying light rays of an unintended wavelength. Each one of slits 154, 156, and 158 is of about 50 microns in width and extends along the surface of slit element 39 in a direction parallel to the rulings 102 in face plate 14. The proper width of a slit is determined by the bandwidth of the phosphor emission spectrum, the grating period, and the distance between face plate 14 and paper 42, which distance is several millimeters.

It will be obvious to those having skill in the art that many changes may be made in the above-described details of the preferred embodiment of the present invention. For example, in a copying system using only two color components, there would be no registration error resulting from nonuniform spacing between adjacent focal configurations. In such systems, the optical wedge surface 144 would, therefore, not be necessary. The scope of the present invention should be determined, therefore, only by the following claims.

I claim:

1. In an image copying system that includes display apparatus which for each image emits a series of components in first and second colors that exit a face plate and accumulate in a region of a light-sensitive medium to form therein a permanent color copy of the image, the improvement comprising:
    wavelength selective means positioned to receive and disperse light rays carrying the first color component to form a first focal configuration in a first location and light rays carrying the second color component to form a second focal configuration in a second location; and
    positioning means to position the light-sensitive medium in synchronism with the emission of the image components such that the region is aligned in the first location for exposure to the first color component and in the second location for exposure to the second color component.

2. The system of claim 1 in which the display apparatus comprises a cathode-ray tube.

3. The system of claim 2 in which two phosphorescent materials applied on different areas on a surface of the face plate develop the light rays of the first and second components.

4. The system of claim 1 in which each of the first and second focal configurations is a line.

5. The system of claim 1 in which the wavelength selective means comprises a diffraction grating.

6. The system of claim 5 in which the face plate has a surface in which the diffraction grating is ruled.

7. The system of claim 1 which further comprises a slit element that is positioned between the wavelength selective means and the light sensitive medium, the slit element including first and second slits through which the light rays carrying the respective first and second color components propagate to limit the optical bandwidth of the light rays passing through them.

8. A system for providing a color copy of an image, comprising:
    image-producing means for producing image information carried by light of plural wavelengths;
    wavelength selective means receiving light of the plural wavelengths for dispersing them to different locations in a focal surface;
    recording means for recording a permanent copy of the image information, the recording means including a light-sensitive medium in which a predetermined color can be developed in response to exposure to a corresponding wavelength of light;
    aligning means for sequentially aligning a region of the light-sensitive medium with each one of the locations in the focal surface; and
    synchronizing means for synchronizing the production of image information carried by each one of the wavelengths of light to the sequential alignment of the region with the corresponding location in the focal surface, thereby to expose the region to the information carried by the wavelengths of light to enable development therein a composite color copy of the image.

9. The system of claim 8 in which the wavelength selective means is characterized in that it disperses at different angles incident light of the plural wavelengths, and which further comprises compensating means in optical association with the wavelength selective means for causing the wavelength selective means to disperse at equal angles at least some of the plural wavelengths.

10. The system of claim 8 in which wavelength selective means comprises a diffraction grating.

11. The system of claim 9 in which the compensating means comprises an optical wedge.

12. The system of claim 9 in which the compensating means comprises an optical wedge that is formed on a first surface of a substrate and the wavelength selective means comprises a diffraction grating formed on a second surface of the substrate.

13. A system for providing a color copy of an image, comprising:
    image-producing means for producing image information carried by light of plural wavelengths;
    light diffracting means receiving light of the plural wavelengths for dispersing them to different locations in a focal surface;
    compensating means in optical association with the light diffracting means to disperse angularly each one of the plural wavelengths by the same amount;
    recording means including a light-sensitive medium for sequentially exposing a region of the light-sensitive medium to the image information appearing at each one of the locations in the focal surface, thereby to enable development of a composite color copy of the image in the light-sensitive medium.

14. The system of claim 13 in which the compensating means and the light diffracting means comprise respective first and second surfaces of a transparent substrate, the first surface including an optical wedge surface having plural subregions that receive incident light of the plural wavelengths and the second surface including a diffraction grating that receives and disperses light propagating through the optical wedge surface.

15. The system of claims 14 in which each subregion supports a phosphorescent material that emits light of a wavelength that differs from the wavelengths emitted by the phosphorescent materials supported on the other subregions, and the subregions include surfaces inclined at angles relative to a reference such that the diffraction grating angularly disperses each one of the plural wavelengths of light by the same amount.

16. The system of claim 14 in which the transparent substrate comprises the face plate of a cathode-ray tube.

* * * * *